US011891845B2

(12) United States Patent
Stewart

(10) Patent No.: US 11,891,845 B2
(45) Date of Patent: Feb. 6, 2024

(54) GATE LATCHING SYSTEM

(71) Applicant: Ian Thomas Stewart, Calgary (CA)

(72) Inventor: Ian Thomas Stewart, Calgary (CA)

( * ) Notice: Subject to any disclaimer, the term of this patent is extended or adjusted under 35 U.S.C. 154(b) by 183 days.

(21) Appl. No.: 17/517,048

(22) Filed: Nov. 2, 2021

(65) Prior Publication Data

US 2023/0136917 A1 May 4, 2023

(51) Int. Cl.
*E05C 3/10* (2006.01)
*E05C 3/00* (2006.01)
*E05B 65/00* (2006.01)
*E05F 1/10* (2006.01)

(52) U.S. Cl.
CPC ............ *E05C 3/10* (2013.01); *E05B 65/0007* (2013.01); *E05C 3/004* (2013.01); *E05F 1/1066* (2013.01); *E05Y 2900/402* (2013.01)

(58) Field of Classification Search
CPC ... E05C 3/10; E05C 3/004; E05C 3/14; E05C 1/04; E05C 1/10; E05F 1/1066; E05B 65/0007; E05B 53/003; E06B 11/02; Y10T 292/1057; Y10T 292/1069; Y10T 292/702; E05Y 2900/402
See application file for complete search history.

(56) References Cited

U.S. PATENT DOCUMENTS 381,694 A * 4/1888 Hatcher .................. E06B 11/02 160/156
720,925 A * 2/1903 Jackson .................. E06B 11/02 49/191
1,233,674 A * 7/1917 Kirsch .................. E05B 53/003 292/235
1,257,334 A * 2/1918 Feltman .................. E06B 11/02 49/159
1,264,788 A * 4/1918 Harris ..................... E06B 11/02 49/159
1,365,179 A * 1/1921 Leasman ................ E06B 11/02 49/154
1,487,106 A * 3/1924 Kelly ...................... E06B 11/02 49/177
1,546,015 A * 7/1925 Durbin .................... E06B 11/02 292/265
1,707,373 A * 4/1929 Tabler ..................... E06B 11/02 160/144
2,746,783 A * 5/1956 Rader .................. E05B 15/022 292/173

(Continued)

FOREIGN PATENT DOCUMENTS

WO 20180132698 A1 7/2018

*Primary Examiner* — Justin B Rephann
(74) *Attorney, Agent, or Firm* — Argus Intellectual Enterprise, LLC; Jordan Sworen; Daniel Enea

(57) ABSTRACT

A gate latching system is provided. A gate latching system installed onto a gate hinged to a stationary post for covert, one-handed operation, the gate latching system comprising a latch bar mounted to an interior side of the hinged gate via a plurality of fasteners where a first end of the latch bar rests against the stationary post preventing the gate from opening in an inward direction. The latch bar having a latch affixed next to the first end of the latch bar. An operator lever affixed at a midpoint of the latch bar and a stiff wire connector coupled to the latch and the operator lever and a latch coupling fastened to the stationary post in plane with the latch to optionally couple with the latch.

19 Claims, 8 Drawing Sheets

(56) References Cited

U.S. PATENT DOCUMENTS

| | | | | | |
|---|---|---|---|---|---|
| 2,759,752 | A * | 8/1956 | Demings | E05C 1/16 | 292/173 |
| 2,810,220 | A * | 10/1957 | Koch | E06B 11/02 | 49/364 |
| 2,953,916 | A * | 9/1960 | Thomas | E05B 65/0007 | 49/365 |
| 3,174,314 | A * | 3/1965 | Johnson | E05B 65/0007 | 292/148 |
| 3,498,658 | A * | 3/1970 | Steenstra | A01K 1/0017 | 292/171 |
| 3,955,837 | A * | 5/1976 | Christensen | E05C 1/14 | 292/336.3 |
| 4,167,281 | A * | 9/1979 | Spencer | E05B 65/0007 | 292/216 |
| 5,358,292 | A | 10/1994 | Van Wiebe et al. | | |
| 5,655,801 | A * | 8/1997 | Casey | E05B 65/0007 | 292/210 |
| 6,170,892 | B1 | 1/2001 | Lantiegne | | |
| 6,679,530 | B2 | 1/2004 | Krynski | | |
| 7,021,678 | B1 * | 4/2006 | Raoult | A01K 1/0017 | 292/341.15 |
| 7,878,558 | B1 * | 2/2011 | Bell | E05B 63/244 | 292/341.15 |
| 8,636,308 | B2 | 1/2014 | Calamia, III | | |
| 8,764,076 | B2 | 7/2014 | Glover | | |
| 9,528,306 | B2 * | 12/2016 | Wepf | E05B 17/2038 | |
| 2009/0146438 | A1 | 6/2009 | Viaud et al. | | |
| 2017/0284136 | A1 | 10/2017 | Ramsey | | |
| 2018/0238084 | A1 | 8/2018 | Weber | | |
| 2020/0378158 | A1 | 12/2020 | Weber | | |

* cited by examiner

GATE LATCHING SYSTEM

FIELD OF THE INVENTION

The present disclosure relates to a gate latching system, more specifically, but not by way of limitation, more particularly to a gate latching system for covert, one-handed operation.

BACKGROUND

Any discussion of the related art throughout the specification should in no way be considered as an admission that such related art is widely known or forms part of common general knowledge in the field.

U.S. Pub. No. 2009/0146438 A1 (Viaud et al.) discloses a gate latch mechanism. Shortcomings include an inability to prevent sag, wear and tear on the gate that often leads to misalignment of the latching mechanism and degradation of the gate, an inability to conceal the unlatching mechanism enabling undesired entry, an inability to promote covert, one-handed operation for added security and ease of use, an inability to prevent the gate from opening in an inward direction beyond the strength of the hinges and contains an intricate latch assembly that may require maintenance.

U.S. Pub. No. 2017/0284136 A1 (Ramsey) discloses a gate hinge and latch with attachment to a support post and one-handed opening of latch and gate. Shortcomings include an inability to prevent sag, wear and tear on the gate that often leads to misalignment of the latching mechanism and degradation of the gate, an inability to conceal the unlatching mechanism enabling undesired entry, an inability to promote covert operation for added security, an inability to prevent the gate from opening in an inward direction beyond the strength of the hinges and contains an intricate latch assembly that may require maintenance.

U.S. Pub. No. 2018/0238084 A1 (Weber) discloses a lever gate latch pull system with a pivoting Z shaped lever. Shortcomings include an inability to prevent sag, wear and tear on the gate that often leads to misalignment of the latching mechanism and degradation of the gate, an inability to conceal the unlatching mechanism enabling undesired entry, an inability to promote covert operation for added security and an inability to prevent the gate from opening in an inward direction beyond the strength of the hinges.

U.S. Pub. No. 2020/0378158 A1 (Weber) discloses a lever gate latch pull system with a pivoting T-shaped lever. Shortcomings include an inability to prevent sag, wear and tear on the gate that often leads to misalignment of the latching mechanism and degradation of the gate, an inability to conceal the unlatching mechanism enabling undesired entry, an inability to promote covert operation for added security and an inability to prevent the gate from opening in an inward direction beyond the strength of the hinges.

U.S. Pat. No. 5,358,292 A (Van Wiebe et al.) discloses a gate latch including a latch bar mounted for movement with a hinged gate, a latch bracket secured to a stationary gate post, a pivotal latch lever mounted in the latch bracket and a cable secured to the pivotal latch lever and a handle in between a bored section of the stationary post. Shortcomings include an inability to prevent sag, wear and tear on the gate that often leads to misalignment of the latching mechanism and degradation of the gate, an inability to conceal the unlatching mechanism enabling undesired entry, an inability to promote covert operation for added security and an inability to prevent the gate from opening in an inward direction beyond the strength of the hinges.

U.S. Pat. No. 6,170,892 B1 (Lantiegne) discloses an improvement in a latch for a gate latch for a railing gate. Shortcomings include an inability to prevent sag, wear and tear on the gate that often leads to misalignment of the latching mechanism and degradation of the gate, an inability to conceal the unlatching mechanism enabling undesired entry, an inability to promote covert operation for added security and an inability to prevent the gate from opening in an inward direction beyond the strength of the hinges.

U.S. Pat. No. 6,679,530 B2 (Krynski) discloses a gate latch assembly. Shortcomings include an inability to conceal the unlatching mechanism enabling undesired entry, an inability to promote covert operation for added security and an inability to prevent the gate from opening in an inward direction beyond the strength of the hinges.

U.S. Pat. No. 8,636,308 B2 (Calamia III) discloses an improved gate latch pull cable made of metal. Shortcomings include an inability to prevent sag, wear and tear on the gate that often leads to misalignment of the latching mechanism and degradation of the gate, an inability to conceal the unlatching mechanism enabling undesired entry, an inability to promote covert operation for added security, an inability to prevent the gate from opening in an inward direction beyond the strength of the hinges and contains an intricate latch assembly that may require maintenance.

U.S. Pat. No. 8,764,076 B2 (Glover) discloses a gate latch release mechanism. Shortcomings include an inability to prevent sag, wear and tear on the gate that often leads to misalignment of the latching mechanism and degradation of the gate, an inability to conceal the unlatching mechanism enabling undesired entry, an inability to promote covert operation for added security, an inability to prevent the gate from opening in an inward direction beyond the strength of the hinges and contains an intricate latch assembly that may require maintenance.

WO Pat. No. 2018/132698 A1 (Grovender) discloses a latch for a railing gate. Shortcomings include an inability to prevent sag, wear and tear on the gate that often leads to misalignment of the latching mechanism and degradation of the gate, an inability to conceal the unlatching mechanism enabling undesired entry, an inability to promote covert, one-handed operation for added security and ease of use and an inability to prevent the gate from opening in an inward direction beyond the strength of the hinges.

All documents cited herein are incorporated by reference.

It is clear that there exists a need for a gate latching system for covert, one-handed operation. There is a need for a gate latching system that provides added strength to the gate structure reducing the sag, wear and tear on the gate, prevents misalignment of the latching mechanism, prevents the gate from opening in an inward direction beyond the strength of the hinges and promotes covert, one-handed operation for added security and ease of use.

The disclosure proposes a gate latching system for covert, one-handed operation that overcomes disadvantages inherent in the existing gate latches and gate latching systems, such as, but not limited to, sag, wear and tear on the gate that often leads to misalignment of the latching mechanism and degradation of the gate and plainly seen unlatching mechanism enabling undesired entry. The present invention provides a gate latching system that may be used with many different embodiments. As such, the general purpose of the present invention, which will be described subsequently in greater detail, is to provide a new and improved a gate latching system for covert, one-handed operation, which provides the advantages and overcomes the aforementioned disadvantages.

BRIEF SUMMARY

It is an object of the invention to provide a gate latching system.

In accordance with an aspect of the invention, there is provided a gate latching system installed onto a gate hinged to a stationary post for covert, one-handed operation, the gate latching system comprising a latch bar mounted to an interior side of the hinged gate via a plurality of fasteners where a first end of the latch bar rests against the stationary post preventing the gate from opening in an inward direction. The latch bar having a latch affixed next to the first end of the latch bar. An operator lever affixed at a midpoint of the latch bar and a stiff wire connector coupled to the latch and the operator lever and a latch coupling fastened to the stationary post in plane with the latch to optionally couple with the latch.

In accordance with an embodiment of the invention, the gate latching system further comprises a self-closing gate spring affixed to the stationary post and to the interior side of the hinged gate.

In accordance with an embodiment of the invention, the latch coupling is an eye bolt.

In accordance with an embodiment of the invention, the gate latching system further comprises the gate having a hatchway providing access to the operator lever.

In accordance with an embodiment of the invention, the hatchway comprises a hatchway cover.

In accordance with an embodiment of the invention, the hatchway cover is decorative to conceal its function.

In accordance with an embodiment of the invention, the decoration is a beware of dog sign.

In accordance with an embodiment of the invention, the gate latching system further comprises an elongated member coupled to the latch lever for decoupling the latch and the latch coupling.

In accordance with an embodiment of the invention, the elongated member extends through a bore formed through the gate.

In accordance with an embodiment of the invention, the elongated member is a string.

In accordance with an embodiment of the invention, the elongated member is a wire.

In accordance with an embodiment of the invention, the elongated member is a cord.

In accordance with an embodiment of the invention, two gate latching systems may be employed together for larger openings.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In the figures, embodiments are illustrated by way of example. It is to be expressly understood that the description and figures are only for the purpose of illustration and as an aid to understanding.

Figure 1:
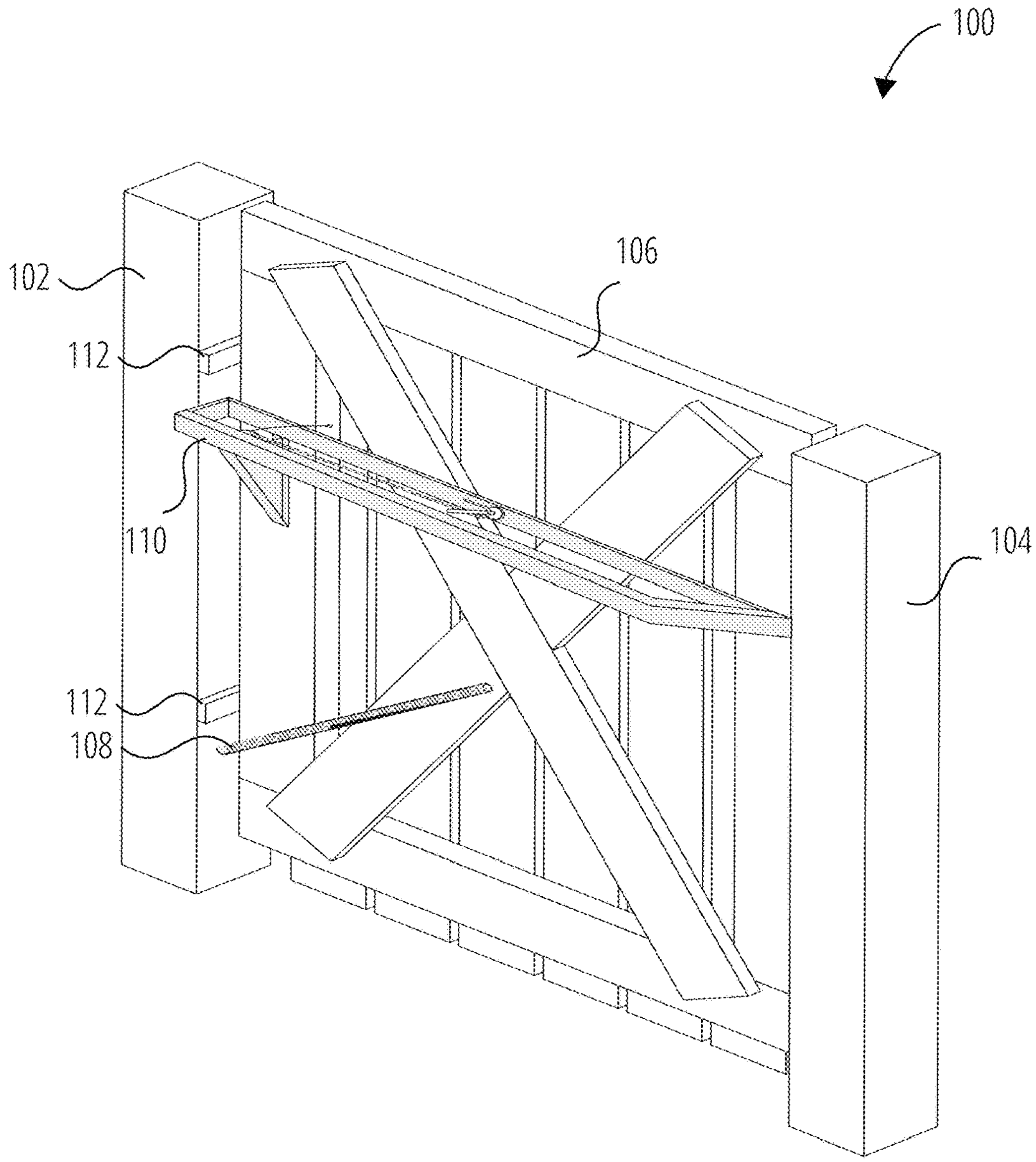

Embodiments will now be described, by way of example only, with reference to the attached figures, wherein the figures:

FIG. 1 illustrates a perspective view 100 of a gate latching system, in accordance with one embodiment.

Figure 2:
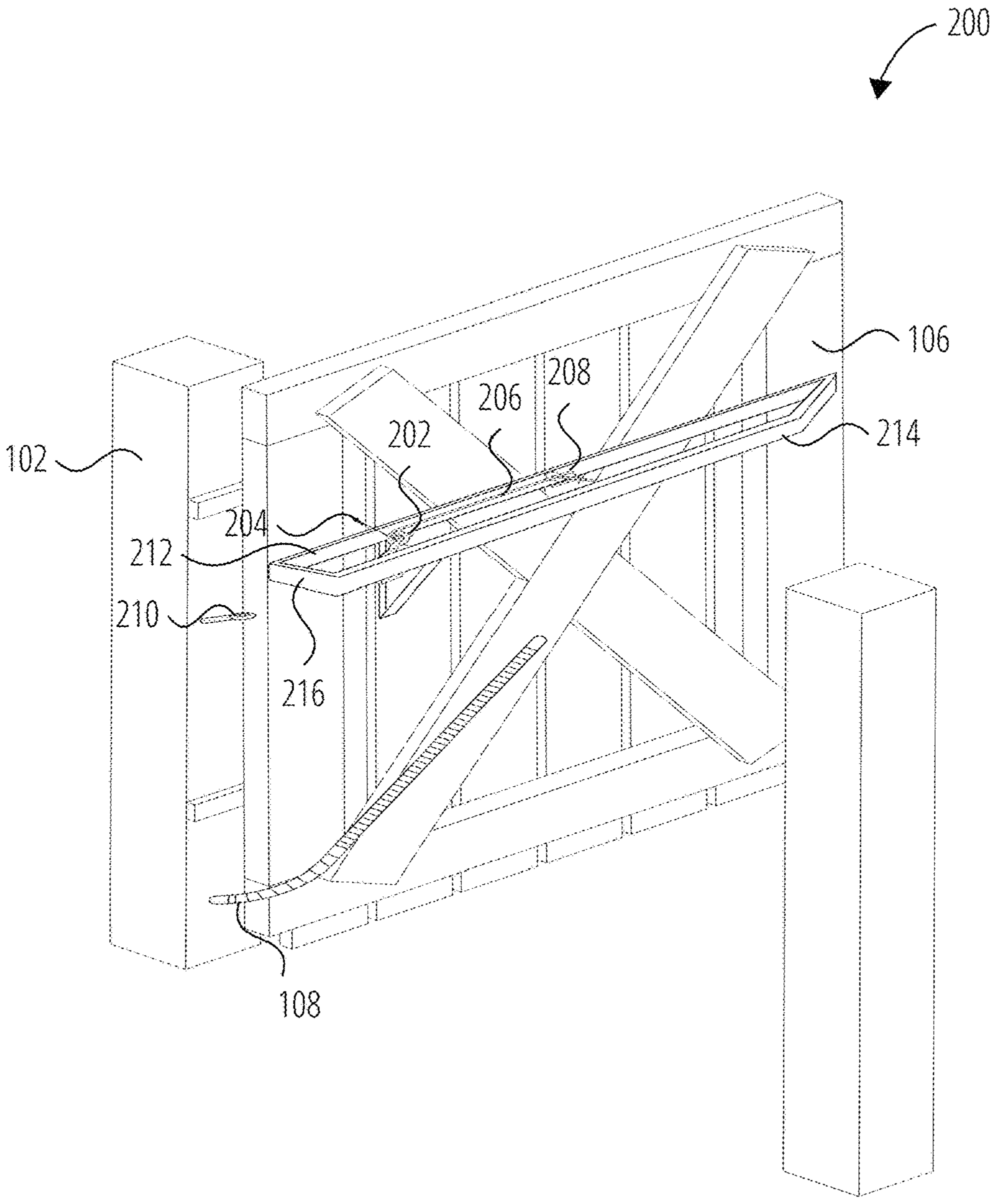

FIG. 2 illustrates a perspective view 200 of a gate latching system, in accordance with one embodiment.

Figure 3:
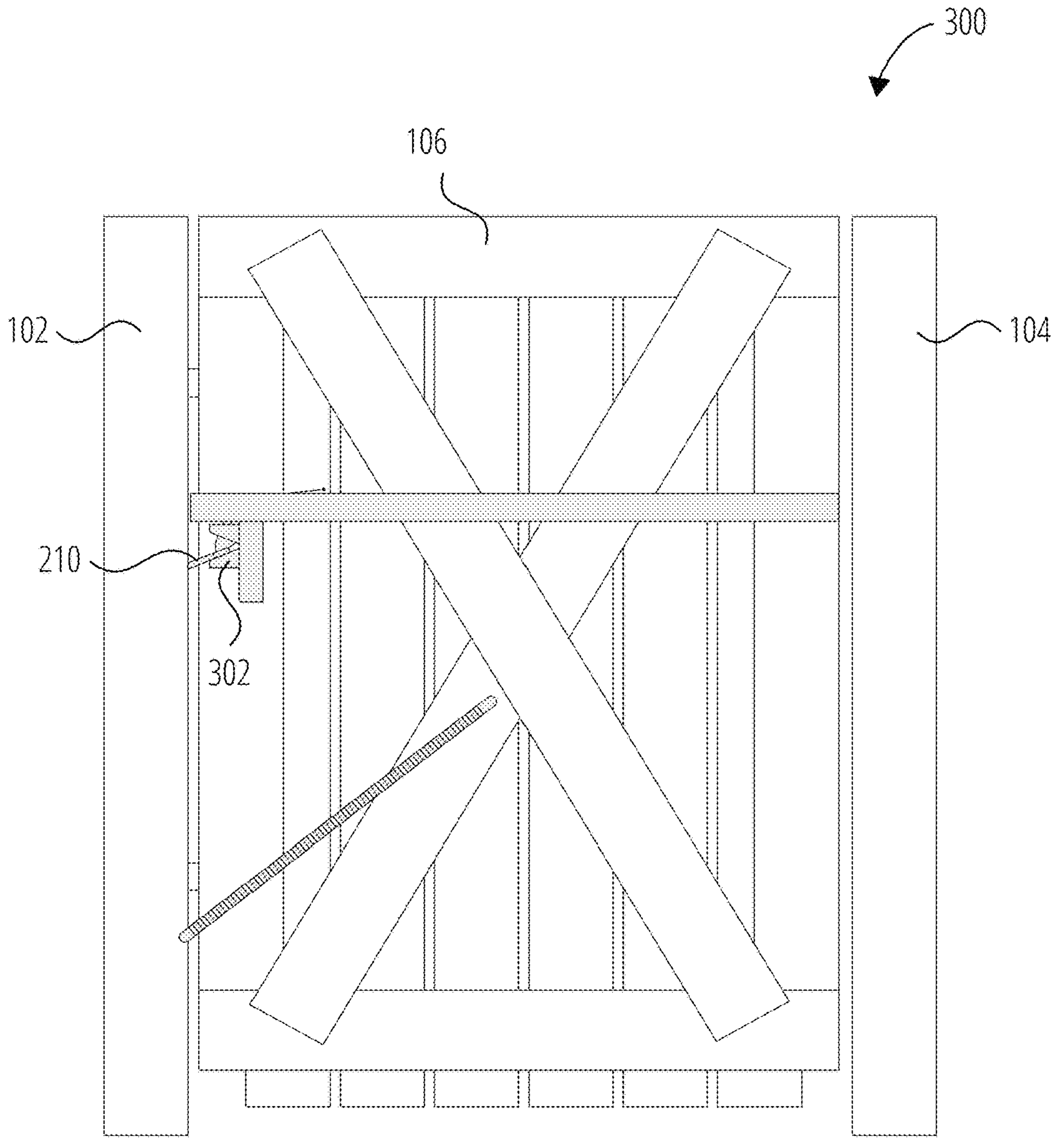

FIG. 3 illustrates a front view 300 of a gate latching system, in accordance with one embodiment.

Figure 4:
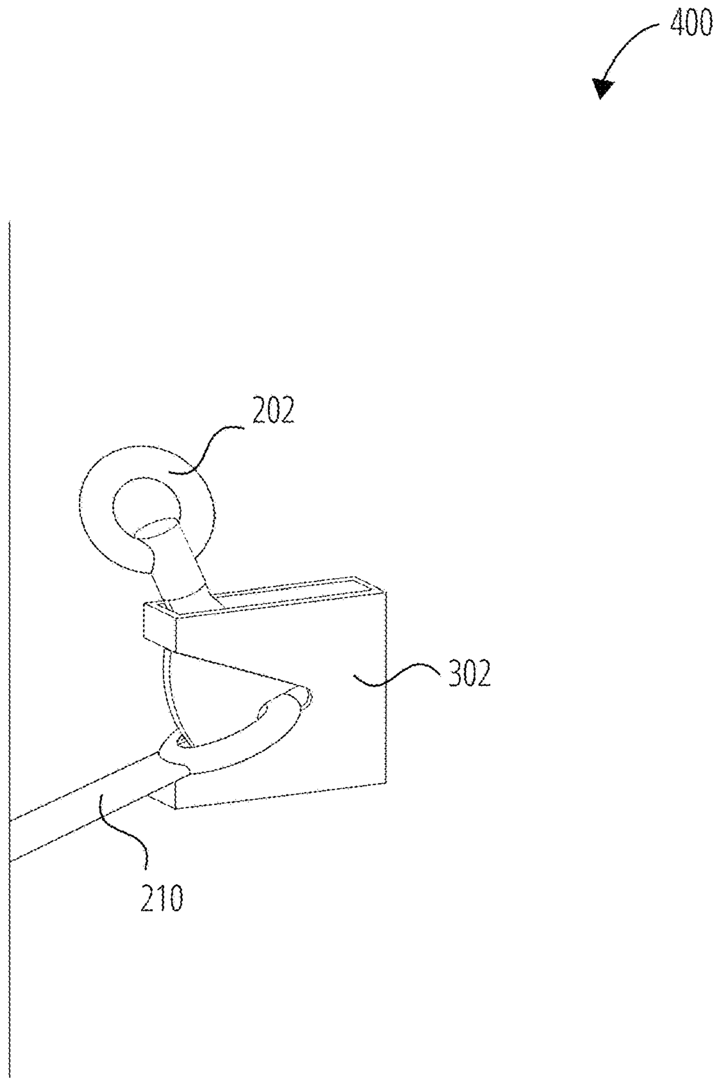

FIG. 4 illustrates a closeup view 400 of a gate latching system, in accordance with one embodiment.

Figure 5:
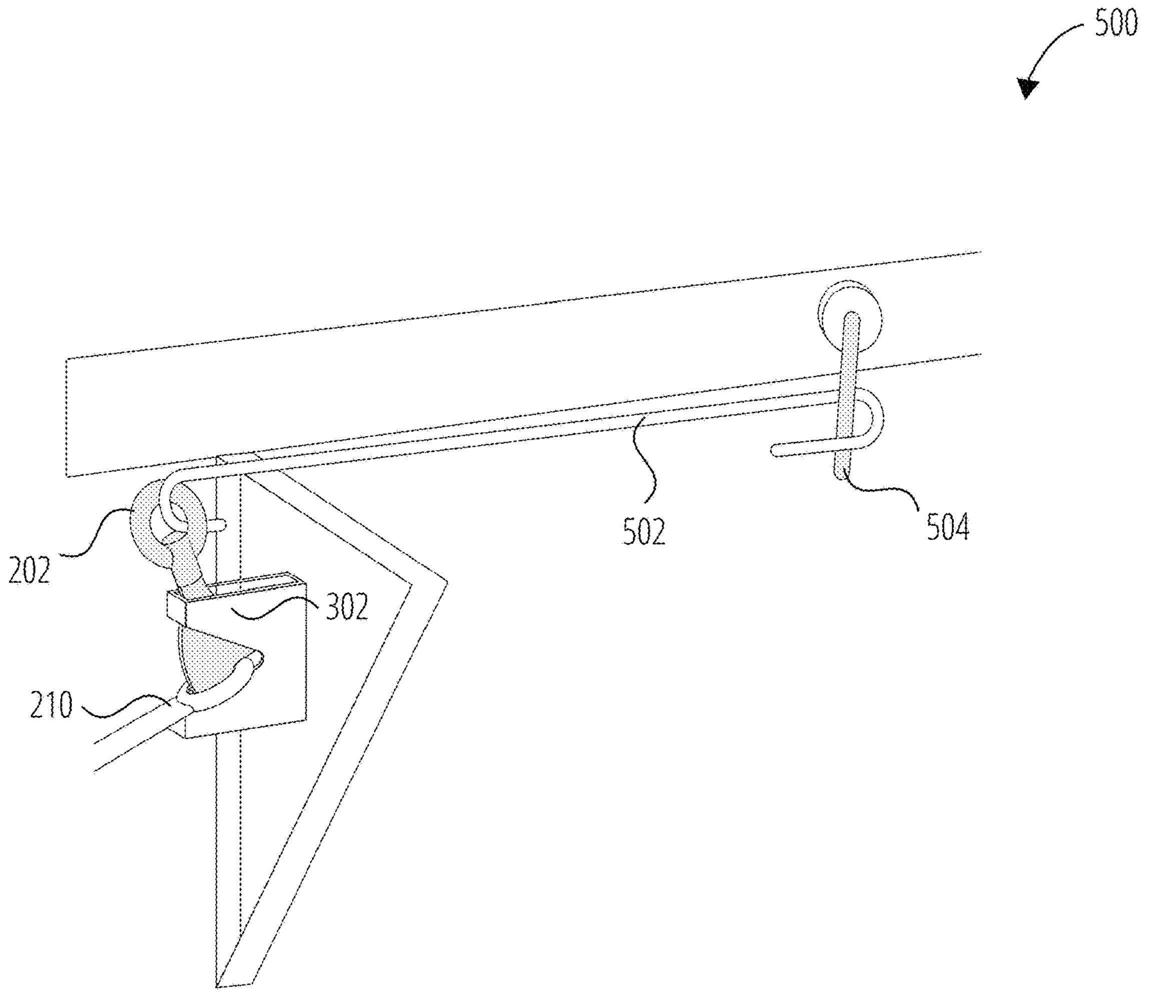

FIG. 5 illustrates a closed view 500 of a gate latching system, in accordance with one embodiment.

Figure 6:
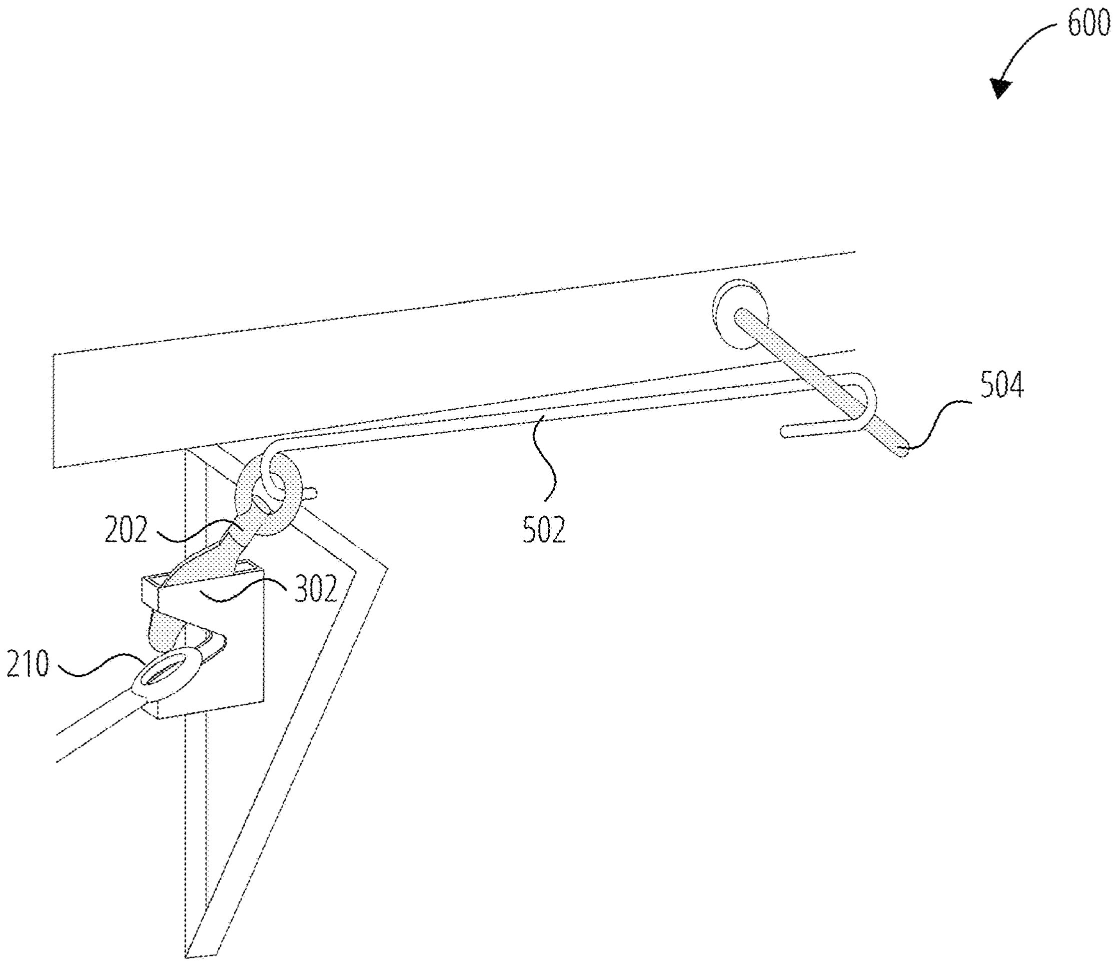

FIG. 6 illustrates an opened view 600 of a gate latching system, in accordance with one embodiment.

Figure 7:
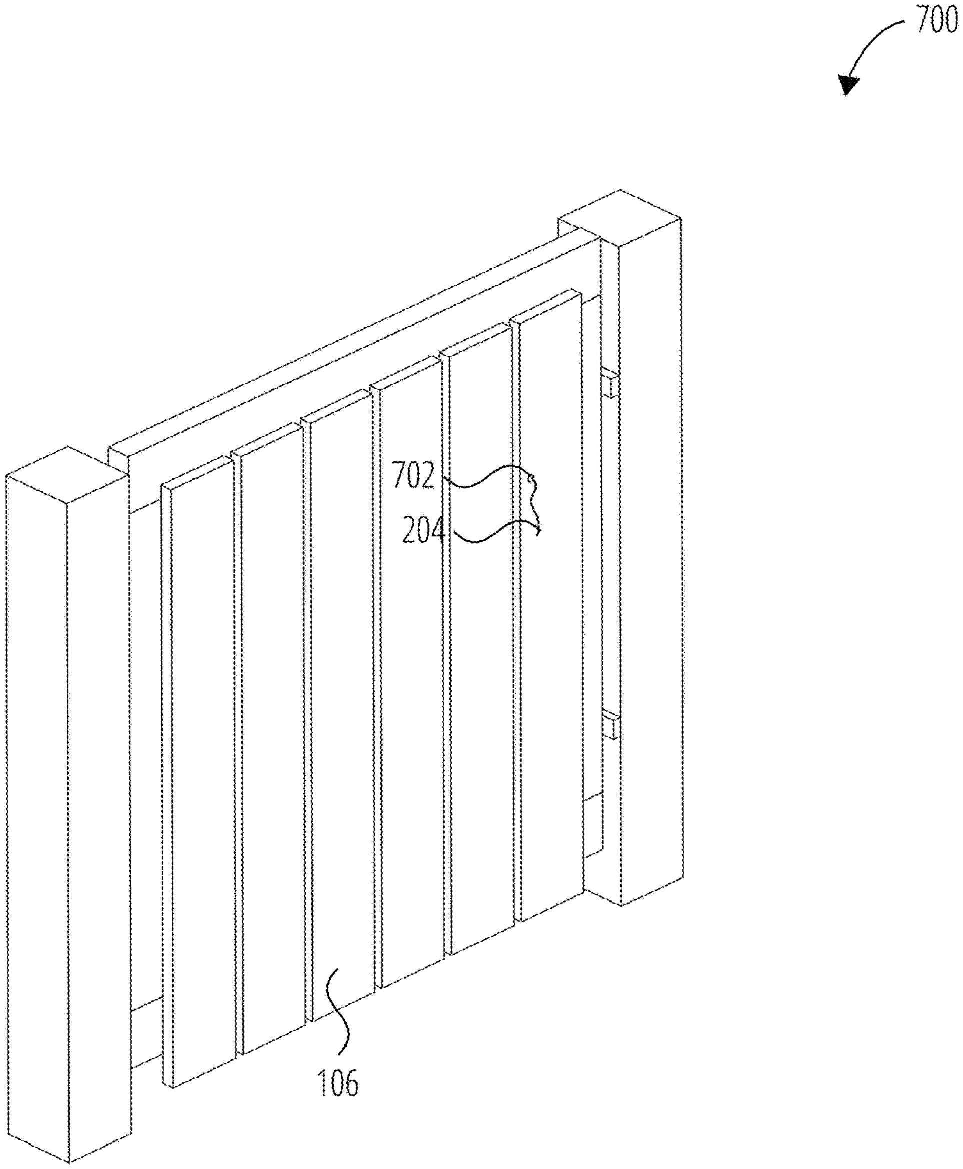

FIG. 7 illustrates a front view 700 of a gate latching system, in accordance with one embodiment.

Figure 8:
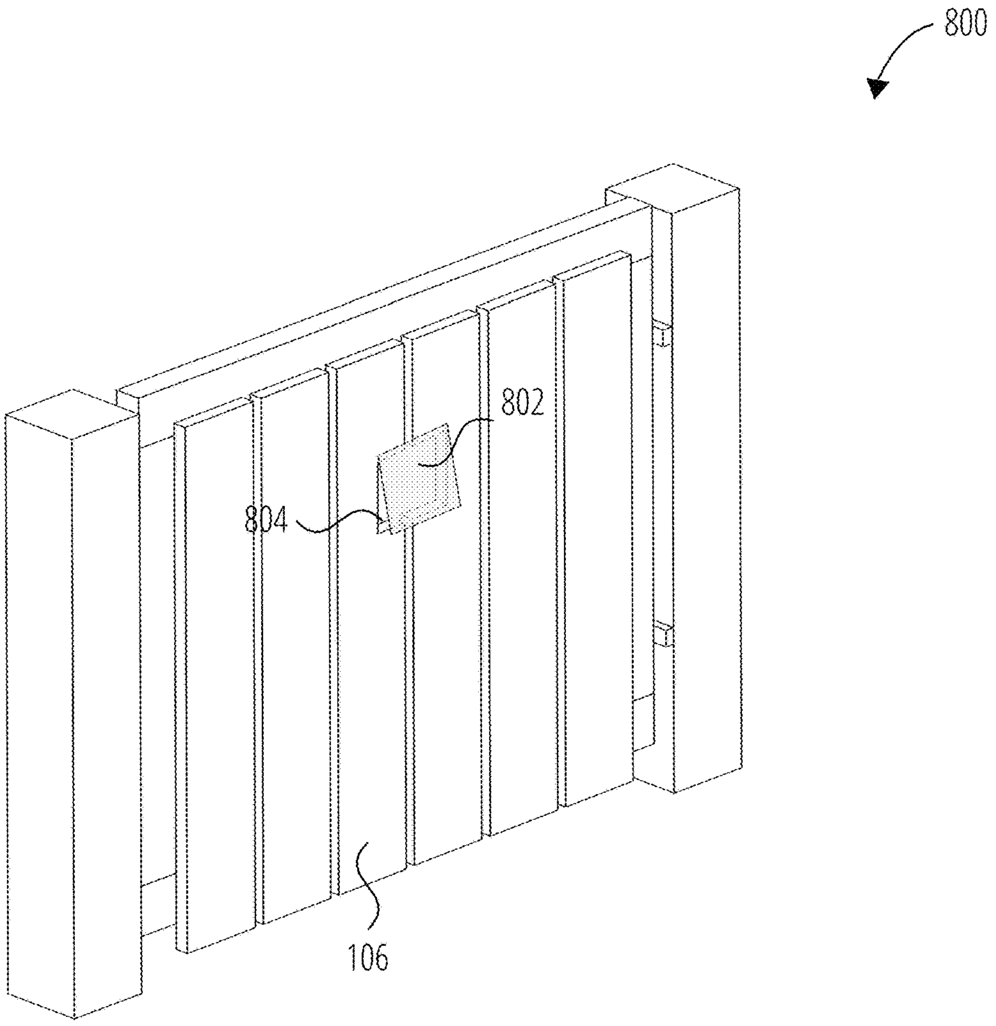

FIG. 8 illustrates a front view 800 of a gate latching system, in accordance with one embodiment.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

The present invention provides a gate latching system that may be used with many different embodiments. As such, the general purpose of the present invention, which will be described subsequently in greater detail, is to provide a new and improved gate latching system for covert, one-handed operation, which provides the advantages and overcomes the aforementioned disadvantages.

The gate latching system is installed onto a gate hinged to a stationary post for covert, one-handed operation. The gate latching system comprises a latch bar mounted to an interior side of the hinged gate via a plurality of fasteners where a first end of the latch bar rests against the stationary post preventing the gate from opening in an inward direction. The latch bar has a latch affixed next to the first end of the latch bar, an operator lever affixed at a midpoint of the latch bar and a stiff wire connector coupled to the latch and the operator lever. A latch coupling is fastened to the stationary post in plane to the latch to optionally couple with the latch.

FIG. 1 illustrates a perspective view 100 of a gate latching system with the gate 106 in a closed position, according to some embodiments. A gate 106 is displayed between a primary post 102 and a secondary post 104. The gate 106 is shown attached to a stationary post, displayed as the primary post 102, via two hinges 112 such that the gate 106 is able to move outward from the secondary post 104. In some embodiments, the secondary post 104 is a house, a garage, a greenhouse or any other structure, without damaging or defacing the adjacent structure. The free side of the gate, the side next to the secondary post 104, doesn't require any latches, hooks, chains, stoppers, bumpers, or other impingements.

A latch bar, displayed as the angle iron push bar 110, is shown mounted to the interior side of the gate 106. The angle iron push bar 110 provides added strength to the gate 106 structure and support mechanisms, reducing sag, wear and tear on the gate, preventing misalignment of the latching mechanism. The angle iron push bar 110 stabilizes the gate 106 and provides added strength through the angle iron push bar 110 spanning the width of the gate 106 while being mounted to the interior side of the gate. Since the angle iron push bar 110 is mounted directly onto the gate 106, as opposed to typically gate locking mechanisms in the art which are applied onto the outer surface of the gate 106 and primary post 102, the gate 106, primary post 102 and support mechanisms tend to shift over time and become misaligned.

Moreover, the angle iron push bar 110 aligns with the primary post 102 and extends out to prevent opening the gate 106 in an inward direction. This is further complimented by the restriction of the hinges 112 in the inward direction. A self-closing gate spring 108 is shown affixed to the gate 106 and the primary post 102 and provides tension between the spring within the self-closing gate spring 108 and the gate 106 in an inward direction, back towards the primary post 102, while it is in the open position. Tension is relieved once the gate 106 and primary post 102 near the closed position and the spring within the self-closing gate spring 108 nears a collapsed state. The self-closing gate spring 108 functions to permit the gate 106 to close behind a user after exiting or entering through the gate 106, preventing the user from accidentally leaving the gate 106 opened.

When a larger opening is desired or required, two gate latching systems can be employed together. In this embodiment, each gate 106 from the two gate latching systems operates independently and retains its ease of operation and lockup security.

FIG. 2 illustrates a perspective view 200 of a gate latching system with the gate 106 in an open position, according to some embodiments. The angle iron push bar 110 is shown with a latch, not currently visible, affixed next to a first end 216 of the angle iron push bar 110, where the first end 216 of the perspective view 100 may come into contact with the primary post 102 when the gate 106 is in the closed position preventing the gate 106 from proceeding any further in an inward direction. A latch coupling, shown as an eye bolt 210, is also shown fastened to the primary post 102 in plane to the latch to optionally couple with the latch when the gate 106 is in the closed position. Furthermore, an operator lever 208 is shown affixed at a midpoint of the angle iron push bar 110 with a stiff wire connector 206 coupled to the lever 202 and the operator lever 208. In some embodiments, the stiff wire connector 206 may have a gauge in the range of 2-50. This system is employed to allow a user to detach the eye bolt 210 from the latch when the user wishes to open the gate 106.

In some embodiments, the gate latching system further comprises an elongated member coupled to lever 202 of the latch for decoupling the latch and the latch coupling or eye bolt 210 shown in FIG. 2. In some embodiments, such as in FIG. 2, the elongated member is a string 204.

The string 204 is shown attached to the lever 202 as an alternative method to detach the eye bolt 210 from the lever 202 when the user wishes to open the gate 106. The string 204 is attached to the lever 202 and may be hooked through the gate 106 for opening the lever 202 from a front side of the gate 106. In some embodiments, the elongated member is a wire. In some embodiments, the elongated member is a cord.

In some embodiments, the gate latching system may be installed onto the interior of a gate 106 via a plurality of fasteners applied across an inner beam 212 of the angle iron push bar 110 into the gate 106 and a plurality of fasteners applied at the top and bottom of the latch, not currently shown, into the gate 106. In some embodiments, the latch is affixed, either screwed, welded, bolted or other methods of affixing known in the art, between the inner beam 212 and the outer beam 214 of the angle iron push bar 110. At the midway point of the angle iron push bar 110, the operator lever 208 may be affixed at the inner beam 212, while being hooked by the stiff wire connector 206 which further hooks into the top of the lever 202 of the latch. An eye bolt 210, or some other latch coupling known in the art, may be screwed into the primary post 102 such that the eye bolt 210 is optionally coupled to the latch for securing the gate 106 closed.

FIG. 3 illustrates a front view 300 of a gate latching system with the gate 106 in a closed position, according to some embodiments. The eye bolt 210 is shown coupled to the lever 202 with the gate 106 in plane between the primary post 102 and the secondary post 104.

FIG. 4 illustrates a closeup view 400 of a gate latching system, according to some embodiments. This closeup view 400 details the coupling between the eye bolt 210 and the lever 202.

FIG. 5 illustrates a closed view 500 of a gate latching system, according to some embodiments. When the gate 106 is closed and the latch is secured to the eye bolt 210, the operating lever 504 is in a vertical position perpendicular to the angle iron push bar 110 as shown while coupled to the stiff wire connector 502 which is further coupled to the lever of the lever 202.

FIG. 6 illustrates an opened view 600 of a gate latching system, according to some embodiments. When the gate 106 is opened and the latch is detached from the eye bolt 210, the operating lever 504 rotates from the vertical position of closed view 500 away from the lever 202 as shown while still coupled to the stiff wire connector 502 which is further coupled to the lever of the lever 202. This movement raises the lever of the lever 202 decoupling the eye bolt 210 and the lever 202 allowing for the gate 106 to move in an outward position. In some embodiments, the operating lever 504 contains a loose fitting connection to the angle iron push bar 110 to allow for movement between the opened and closed positions. The gate latching system enables single-hand operation of the gate 106, latching or unlatching, by a user.

FIG. 7 illustrates a front view 700 of a gate latching system, according to some embodiments. In some embodiments, the elongated member extends through a bore formed through the gate. This is demonstrated by the string 204 which is threaded through a bore 702 formed through the gate 106 as shown in FIG. 7. The user can pull the string 204 from the front side of the gate 106 away from the gate 106 in order to lift the lever 202 and decouple the latch 302 and eye bolt 210 for opening the gate 106. The string 204 can blend in with the surface of the gate 106 and be difficult to detect for users unaware of its existence.

FIG. 8 illustrates a front view 800 of a gate latching system, according to some embodiments. In some embodiments, an opening is cut through the gate 106 or is manufactured into the gate 106 above the mid-way point where the operator lever 208 is accessible in order for a user to be able to open the gate 106 from the front side of the gate 106. This opening is shown in FIG. 8 by the hatchway 804. In some embodiments, the hatchway 804 comprises a hatchway cover 802 in order to help conceal the access point to the operator lever 208. In some embodiments, the hatchway cover 802 is decorated, such as a beware of dog sign, in order to better conceal its function as an access point to the operator lever 208.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. As can be understood, the examples described above are intended to be exemplary only.

The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

The term “connected”, “attached”, “affixed” or “coupled to” may include both direct coupling (in which two elements that are coupled to each other contact each other) and indirect coupling (in which at least one additional element is located between the two elements).

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

I claim:

1. A gate latching system installed onto a gate hinged to a stationary post for covert, one-handed operation, said gate latching system comprising:

a latch bar mounted to an interior side of said hinged gate via a plurality of fasteners where a first end of said latch bar rests against said stationary post preventing said gate from opening in an inward direction, said latch bar having a latch affixed next to said first end of said latch bar, an operator lever affixed at a midpoint of said latch bar and a stiff wire connector coupled to said latch and said operator lever; and a latch coupling fastened to said stationary post in plane with said latch to optionally couple with said latch;

wherein said gate latching system further comprises a self-closing gate spring affixed to said stationary post and to said interior side of said hinged gate.

2. The gate latching system of claim 1, wherein said latch coupling is an eye bolt.

3. The gate latching system of claim 1, wherein said gate latching system further comprises said gate having a hatchway providing access to said operator lever.

4. The gate latching system of claim 3, wherein said hatchway comprises a hatchway cover.

5. The gate latching system of claim 3, wherein said hatchway cover is a decoration to conceal its function.

6. The gate latching system of claim 5, wherein said decoration is a beware of dog sign.

7. The gate latching system of claim 1, wherein said gate latching system further comprises an elongated member coupled to said latch lever for decoupling said latch and said latch coupling.

8. The gate latching system of claim 7, wherein said elongated member extends through a bore formed through said gate.

9. The gate latching system of claim 7, wherein said elongated member is a string.

10. The gate latching system of claim 7, wherein said elongated member is a wire.

11. The gate latching system of claim 7, wherein said elongated member is a cord.

12. The gate latching system of claim 1, wherein two gate latching systems may be employed together for larger openings.

13. A gate latching system installed onto a gate hinged to a stationary post for covert, one-handed operation, said gate latching system comprising:

a latch bar mounted to an interior side of said hinged gate via a plurality of fasteners where a first end of said latch bar rests against said stationary post preventing said gate from opening in an inward direction, said latch bar having a latch affixed next to said first end of said latch bar, an operator lever affixed at a midpoint of said latch bar and a stiff wire connector coupled to said latch and said operator lever;

a latch coupling fastened to said stationary post in plane with said latch to optionally couple with said latch;

wherein said gate latching system further comprises said gate having a hatchway providing access to said operator lever;

wherein said hatchway cover is a decoration to conceal its function.

14. The gate latching system of claim 13, wherein said gate latching system further comprises an elongated member coupled to said latch lever for decoupling said latch and said latch coupling.

15. The gate latching system of claim 14, wherein said elongated member is a cord.

16. A gate latching system installed onto a gate hinged to a stationary post for covert, one-handed operation, said gate latching system comprising:

a latch bar mounted to an interior side of said hinged gate via a plurality of fasteners where a first end of said latch bar rests against said stationary post preventing said gate from opening in an inward direction, said latch bar having a latch affixed next to said first end of said latch bar, an operator lever affixed at a midpoint of said latch bar and a stiff wire connector coupled to said latch and said operator lever;

a latch coupling fastened to said stationary post in plane with said latch to optionally couple with said latch;

wherein said gate latching system further comprises an elongated member coupled to said latch lever for decoupling said latch and said latch coupling.

17. The gate latching system of claim 16, wherein said gate latching system further comprises said gate having a hatchway providing access to said operator lever.

18. The gate latching system of claim 17, wherein said hatchway cover is a decoration to conceal its function.

19. The gate latching system of claim 16, wherein said latch coupling is an eye bolt.

* * * * *